(12) United States Patent
Gray

(10) Patent No.: US 8,060,459 B2
(45) Date of Patent: Nov. 15, 2011

(54) METHOD FOR GENERATING PROSPECTIVE AVAILABILITY DATA

(75) Inventor: Thomas A. Gray, Mansfield (CA)

(73) Assignee: Mitel Networks Corporation, Ottawa, Ontario (CA)

( * ) Notice: Subject to any disclaimer, the term of this patent is extended or adjusted under 35 U.S.C. 154(b) by 1002 days.

(21) Appl. No.: 12/002,199

(22) Filed: Dec. 14, 2007

(65) Prior Publication Data

US 2008/0114713 A1    May 15, 2008

Related U.S. Application Data

(63) Continuation-in-part of application No. 10/631,834, filed on Aug. 1, 2003, now Pat. No. 7,415,104.

(51) Int. Cl.
*G06F 17/00* (2006.01)
(52) U.S. Cl. ........ 706/47; 379/266.08; 707/951
(58) Field of Classification Search ........ 715/963; 707/951; 708/112; 379/266.08; 706/47
See application file for complete search history.

(56) References Cited

U.S. PATENT DOCUMENTS

| | | | | |
|---|---|---|---|---|
| 5,155,761 A * | 10/1992 | Hammond | | 379/88.2 |
| 5,467,268 A * | 11/1995 | Sisley et al. | | 705/9 |
| 5,590,188 A | 12/1996 | Crockett | | |
| 5,754,627 A | 5/1998 | Butler et al. | | |
| 5,826,040 A * | 10/1998 | Fargher et al. | | 705/8 |
| 6,301,608 B1 | 10/2001 | Rochkind | | |
| 6,301,609 B1 | 10/2001 | Aravamudan et al. | | |
| 6,421,439 B1 | 7/2002 | Liffick | | |
| 6,700,967 B2 | 3/2004 | Kleinoder et al. | | |
| 6,745,200 B2 * | 6/2004 | Starkey | | 1/1 |
| 7,023,979 B1 * | 4/2006 | Wu et al. | | 379/265.11 |
| 7,076,043 B2 * | 7/2006 | Curbow et al. | | 379/201.06 |
| 7,305,437 B2 * | 12/2007 | Horvitz et al. | | 709/204 |
| 7,519,676 B2 * | 4/2009 | Horvitz et al. | | 709/207 |
| 2003/0206619 A1 * | 11/2003 | Curbow et al. | | 379/210.01 |
| 2004/0037396 A1 | 2/2004 | Gray et al. | | |
| 2004/0039630 A1 * | 2/2004 | Begole et al. | | 705/11 |
| 2005/0068167 A1 | 3/2005 | Boyer et al. | | |
| 2005/0149335 A1 | 7/2005 | Mesbah | | |
| 2005/0246628 A1 | 11/2005 | Hines | | |
| 2005/0276397 A1 | 12/2005 | Hiatt et al. | | |
| 2007/0005406 A1 * | 1/2007 | Assadian et al. | | 705/8 |
| 2007/0050225 A1 * | 3/2007 | Leslie | | 705/8 |
| 2007/0263791 A1 | 11/2007 | Alperin et al. | | |
| 2008/0115088 A1 * | 5/2008 | Frankel et al. | | 715/835 |

FOREIGN PATENT DOCUMENTS

| | | |
|---|---|---|
| EP | 0 510 411 B1 | 3/1992 |
| EP | 0611239 A | 8/1994 |
| EP | 1524831 A | 4/2005 |
| EP | 1768369 A | 3/2007 |
| GB | 2 351 870 A | 10/2001 |
| GB | 2 369 529 A | 5/2002 |
| WO | WO 99/26424 | 5/1999 |
| WO | WO 2007/072323 A2 | 6/2007 |

\* cited by examiner

*Primary Examiner* — Jeffrey A Gaffin
*Assistant Examiner* — David H Kim

(57) ABSTRACT

A method and system of generating prospective ability data is provided. Availability for at least one future temporal block is estimated, responsive to receiving an availability request, by applying availability rules to temporal block data associated with the at least one future temporal block, the temporal block data stored in a database.

13 Claims, 8 Drawing Sheets

US 8,060,459 B2

METHOD FOR GENERATING PROSPECTIVE AVAILABILITY DATA

CROSS-REFERENCE TO RELATED APPLICATIONS

This is a continuation in part of U.S. application Ser. No. 10/631,834, filed Aug. 1, 2003, now U.S. Pat. No. 7,415,104, incorporated herein by reference.

FIELD

The specification relates generally to context-aware call handling in communication systems, and more particularly to a method and system for generating prospective ability data.

BACKGROUND

It is commonplace for users of PBXs and other communication systems to be directed to voice mail when they attempt to reach a potential collaborator. However, this is not entirely appropriate for situations in which the parties need to directly talk to each other. The calling party can leave a message requesting to be called back but there is no assurance that the called party will listen to the voice mail in a timely manner or that the calling party will be available when the called party makes the requested return call. The familiar game of 'telephone tag' is created in this way.

Telephone tag is but a symptom of a larger problem. Social science research has indicated that informal interaction is an essential element of workplace life to provide for both innovation and efficiency. Telephone tag is then a symptom of impaired interaction that indicates that electronic communication services can be improved. To this end, the telecommunications industry has been developing presence and availability technology to provide for the necessary element of causal awareness. These allow users to share their current availability with potential collaborators. However knowledge of current availability is not useful when called party is not available and the parties need to communicate with each other.

SUMMARY

A key aspect of the present invention is integration of availability indicators to decisions on call disposition by call control. Applicant's co-pending application "Context Aware Call Handling System", U.S. Ser. No. 10/631,834 describes the operation of a context-aware call handling system. In new IP telephony systems such as SIP, a call set up message (e.g. the INVITE message in SIP, and the IAM message in IN) can include a large amount of background information about a call. The call set up message can include contextual information (e.g. the SUBJECT line in SIP), such as the calling party identity, the degree of urgency of the call, the purpose of the call, etc. Applicant's application filed on the same day as this application and entitled "Context Aware Call Handling System" describes a structure whereby this call information is analyzed and decisions are made on call handling based on the call information matching a specific context of the called party.

The contextual call handling system of Applicant's co-pending application "Context Aware Call Handling System", U.S. Ser. No. 10/631,834, takes received information and uses it to generate newer information. For example, if a call is from directory number (DN) 555-2368, the contextual system determines, firstly, who the number belongs to (e.g. John Doe) and the relationship of that owner to the called party (e.g. John Doe is the manager of the called party). This provides much more specific information about the nature of the call than is available in conventional telephony systems. The called party is therefore able to establish rules that are relevant to his personal needs for call disposition (e.g. rules to deal with calls from his manager differently than calls from some arbitrary directory number). Also, if the manager is mobile and the directory number that he uses changes, the user can create abstract rules indicating the call control actions he wishes to be taken upon receiving a call from his manager and the address of a local service that correlates directory numbers with the name of the user who is registered with that number. The user does not have to make any changes in his rule set to deal with such a mobile manager. It is expected that features such as this will become common in future personal mobile IP telephony systems.

The present invention extends the system described in Applicant's co-pending application "Context Aware Call Handling System", U.S. Ser. No. 10/631,834, to provide availability information generated by rules based on responses to received hypothetical questions. The indicators of availability include a fuzzy degree of availability from "Not-Available" to "Very-Available". The results of multiple rules that fire in response to one hypothetical availability query are combined by fuzzy techniques to create a composite crisp availability decision. Removing cases that are of low relevance minimizes the effect of any factor involved in multiple fuzzy availability decisions. In the preferred embodiment, this is done by using only the most specific rule in which the factor is involved, as determined by a count of the number of factors involved in a rule—the rule with the most factors being considered to be more specific and thus more relevant. When it is not possible to select one rule among conflict rules, the system either selects the most recently created rule or simply chooses a rule at random (or randomly chooses a rule in the event of a tie among most specific rules). The use of the specific rules in call handling for availability decisions solves the problem of compatibility between availability rules and call handling rules discussed above.

A first broad aspect of an embodiment seeks to provide a method of generating prospective availability data. The method comprises receiving a request regarding an availability of a user for receiving a call and transmitting a message regarding the availability of the user as a response to the request, generating prospective availability data regarding the user, including estimating the availability of the user for at least one future temporal block by applying availability rules to temporal block data for the user associated with the at least one future temporal block, and the message being generated in response to estimating that the user is available in the at least one future temporal block. The method further includes estimating the availability of the user for the at least one future temporal block by querying at least one of a calendar of a user associated with said temporal block data and a calendar of at least one other user associated with the user to determine meetings in which the user may be involved, and estimating confidence of the queried calendar by querying an estimator that monitors actual meeting information of the user associated with the queried calendar. Then comparing the actual meeting information with meeting information recorded in said queried calendar, and determining the proportion of accurately recorded meeting information with respect to a total amount of meeting information recorded, and giving preference to meetings associated with the queried calendar having the highest confidence when applying said availability rules.

In some embodiments of the first broad aspect, applying the availability rules to the at least one future temporal block comprises applying the availability rules to a plurality of future temporal blocks. In some of these embodiments, applying the availability rules to the plurality of future temporal blocks occurs in temporal order until at least one of the plurality of future temporal blocks is determined to be prospectively available.

In other embodiments of the first broad aspect, estimating availability for the at least one future temporal block is further responsive to determining that current availability is not-available.

In further embodiments of the first broad aspect, the method further comprises generating a prospective availability message in response to determining that the at least one future temporal block is prospectively available and transmitting the prospective availability message to indicate prospective availability as a response to the availability request. In some of these embodiments, the method further comprises generating a second prospective availability message for informing a user associated with the temporal block data of the transmitting the prospective availability message.

In yet further embodiments of the first broad aspect, applying availability rules comprises determining a proactive availability and a reliability estimate of availability for the at least one future temporal block. In some of these embodiments, the method further comprises generating a prospective availability message in response to determining that the at least one future temporal block is prospectively available and transmitting the prospective availability message to indicate prospective availability as a response to the availability request, the prospective availability message comprising the proactive estimate of availability and the reliability estimate.

In some embodiments of the first broad aspect, the availability rules comprise fuzzy indicators of degrees of availability, and the applying availability rules to the at least one future temporal block comprises pre-determined ones of the availability rules firing responses, and computing from the responses a crisp indicator of availability.

In other embodiments of the first broad aspect, the availability rules comprise at least one of a user indication rule, a location rule, a time rule, an activity rule and a call type rule.

In yet further embodiments of the first broad aspect, estimating availability for at least one future temporal block in an appointment schedule comprises transmitting an availability request and, in response, receiving an indication of availability.

In some embodiments of the first broad aspect, the temporal block data comprises at least one a user assertion, a calendar associated with a user, a calendar of another user associated with the user, and socially-aware heuristics.

In other embodiments of the first broad aspect, the availability comprises a confidence metric of availability determined by processing at least one estimate of availability for the at least one future temporal block.

A second broad aspect of an embodiment seeks to provide a system for generating prospective ability data. The system comprises a proactive availability agent for managing availability requests and responding to the availability queries. The system further comprises a shared memory space accessible to the proactive availability agent for storing data associated with prospective availability. The system further comprises at least one agent coupled to the shared memory space, the at least one agent for estimating availability for at least one future temporal block, responsive to receiving an availability request, by applying availability rules to temporal block data associated with the at least one future temporal block, the temporal block data stored in the shared memory space.

BRIEF DESCRIPTIONS OF THE DRAWINGS

A detailed description of the invention is set forth herein below, with reference to the following drawings, in which.

DETAILED DESCRIPTION OF THE EMBODIMENTS

Applicant's co-pending application "Context Aware Call Handling System", U.S. Ser. No. 10/631,834, filed on Aug. 1, 2003 and incorporated herein by reference, describes the operation of a context-aware call handling system. Present embodiments use the basic structure described in Applicant's co-pending application U.S. Ser. No. 10/631,834 for the generation of call control handling decisions and for the generation of availability information. The basic structure is a blackboard system surrounded by knowledge sources which process contextual information contained in a call set up message in light of a user's current context. The contextual information determines how calls are routed for an individual so as to create a form of "personal mobility", which is a set of features of increasing interest in the telephony arts distinct from and beyond traditional call forwarding features. With personal mobility features, rather than forwarding the call to another device the most appropriate device belonging to a person is selected to handle a call.

Thus, the selection of a device for call control is either towards a user (e.g. to his/her wireless device), away from a user (e.g. to his/her voice mail, secretary, etc.), or initially toward the user and then either toward the user or away from the user based on the user's response to being asked about call disposition. As described in our co-pending application having U.S. Ser. No. 10/631,834, this determination is intrinsically made on an assessment of the user's availability to the incoming caller. Thus, the same structure may be used to explicitly determine availability and to distribute availability to interested users.

Figure 1:
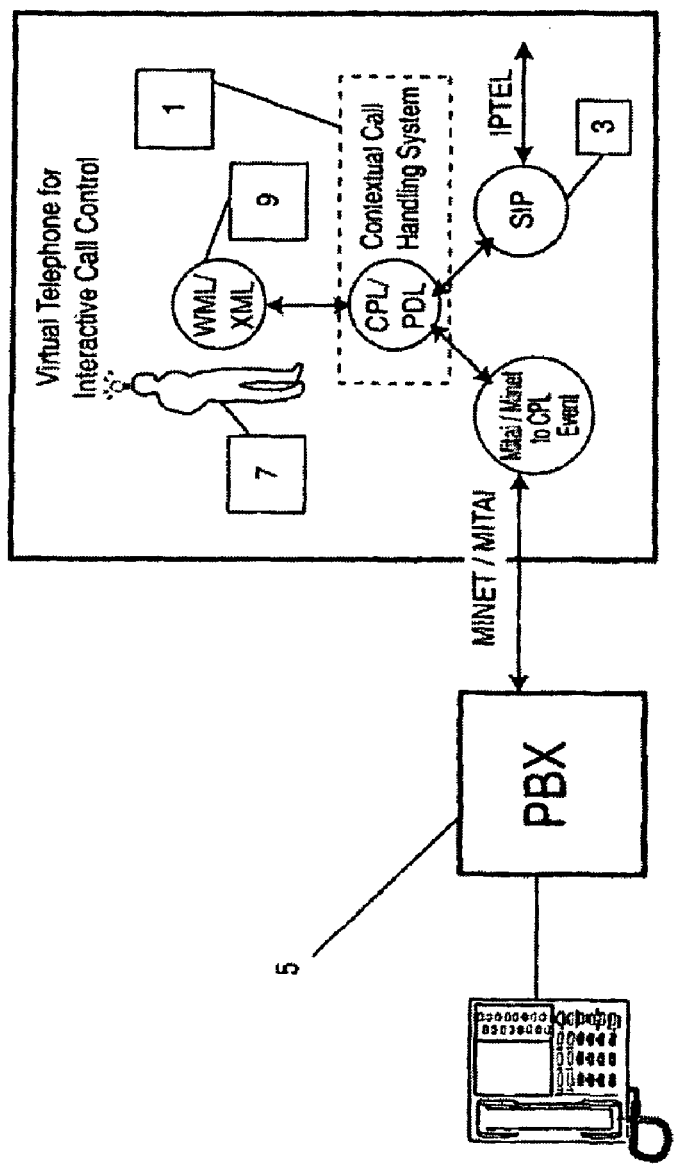
FIG. 1 is a functional diagram of an Internet telephony system according to the present invention for generating availability indicators from call control policies and awareness data.

In the last case (i.e. initially toward the user and then either toward the user or away from the user based on the user's response to being asked about call disposition), a call is presented to the user's device with options for handling, but with call alerting that is more discreet than in the case in which the call is directed to the user. With reference to FIG. 1, incoming call messages are directed to the contextual call handling system 1 (e.g. via SIP 3 or a traditional PBX system 5). The contextual call handling system can either make a final decision on the call or refer it to the user 7. In the illustrative example of FIG. 1, it is assumed that the user is on a wireless device with telephony access via a WML browser 9. However, a person skilled in the art will appreciate that other media are possible.

In the first two cases (i.e. toward the user, and away from the user), the availability information may be deduced directly from the proposed action. Hence, the contextual call control system of Applicant's co-pending application U.S. Ser. No. 10/631,834 directly ties availability indicators to these proposed actions. In the last case (i.e. call disposition is based on decision of user 7), the system according to the present embodiments sets forth a mechanism for the addition of rules to generate fuzzy indicators of availability. These fuzzy indicators are composed with the indicator derived from the proposed action to produce a crisp indicator of availability that can be sent out to a subscribing user Before turning to an illustrative example for describing an embodiment, the basic structure of the contextual call control system 1 as described in Applicant's co-pending application, U.S. Ser. No. 10/631,834 will be provided with reference to FIGS. 2-5.

Figure 2:
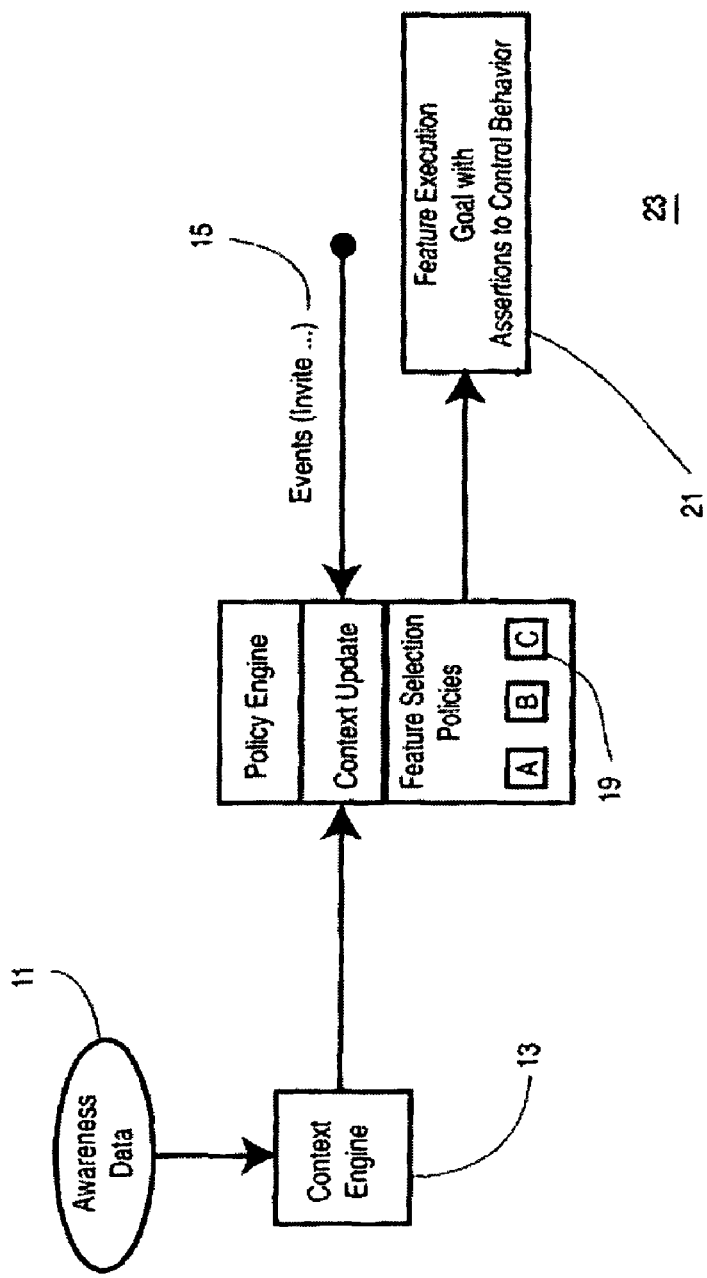
FIG. 2 is a block diagram of a contextual call handling system of the Internet telephony system in FIG. 1.

Turning to FIG. 2, a functional diagram is provided of the system according to present embodiments. In operation, awareness data 11 is received from one or more ubiquitous sensors (not shown), relating to the user's location and activities, and applied to a context engine 13. A variety of technologies are available for tracking the locations of people. Examples of such ubiquitous sensors include the Active Badge System [Roy Want, Andy Hopper, Veronica Falcao, Jonathan Gibbons, "The Active Badge Location System", ACM Transactions on Information Systems 10(1) 91-102, 1992], PARCTabs [Norman Adams, Bill N. Schilit, Rich Gold, Michael Tso and Roy Want, "The PARCTAB Mobile Computing System", Proceedings of the Fourth Workshop on Workstation Operating Systems (WWOS-IV), pages 34-39, Napa, C A, October 1993], mobile phones [Peter Duffet-Smith, "High precision CURSOR and digital CURSOR: the real alternatives to GPS", Proceedings of EURONAV 96 Conference on Vehicle Navigation and Control, Royal Institute of Navigation, 1996] and ultrasonic devices [Andy Ward, Alan Jones and Andy Hopper, "A new location technique for the active office", IEEE Personal Communications 4(5), 43-7, 1997].

Applicant's co-pending application, "Availability and Location Predictor Using Call Processing Indications", U.S. Ser. No. 10/631,819, filed on Aug. 1, 2003 and incorporated herein by reference, describes a method of evidence gathering that surmises (i.e. makes guesses) about user availability from his/her interactions with a PBX system. The interactions are gathered as awareness information and processed by an algorithm into availability information. By using awareness information as evidence, the algorithm makes predictions about the users' availability or makes decisions in call processing. This information is fed back into a shared database (e.g. a tuple space) as assertions that indicate high level assessments about the user's state. These assessments are then used by the call processing components described below to make decisions on call handling.

Additional aspects relating to the application of awareness data 11 to context-based communication systems is described in applicant's co-pending application "System and method for facilitating communication using presence and communication services", U.S. Ser. No. 10/631,789, filed on Jul. 31, 2003 and incorporated herein by reference.

Awareness data (i.e. raw information about the user) that has been processed by context engine 13 into availability information is then applied to a policy engine 15 in the form of assertions of interest to policies within the system, as described in detail below. The policy engine 15 includes a context update block 19 and feature selection policies 21.

In context update block 19, an incoming event (e.g. SIP INVITE) is related to the current context of the user. Every event has associated with it some indicators that are pertinent to the user's call that provide evidence of the relevance, urgency and importance of the call to the user. Such indicators include caller identity, role relationship between caller and called party, group or project membership, location of user, current state of called user, subject of the call, and so on. Some of these evidential indicators are explicit in the call and some can be derived by inference from other indicators (e.g. awareness data, as discussed above). The context update block 19 uses opportunistic reasoning to develop the required evidence. This evidence is then supplied to the feature selection policies 21 for selecting a feature, discussed in greater detail below. As discussed in greater detail below, the evidential indicators are in the form of fuzzy variables. The fuzziness of these variables is used to indicate the degree of credence that the system has in them.

In the context update evidence gathering process performed by block 19, the system occasionally asks the user which feature he/she wishes to have executed. Sending the user options to his/her wireless browser asking for his/her selection is one among several mutually appropriate options for accomplishing this. Moreover, options may be sent to the calling party asking him/her to select one of several acceptable options.

As discussed above, the user sets some of the policies used in the opportunistic reasoning of context update block 19, although many of the policies are implicit in the way people generally interact. Thus, several default policies are set by system administrators using sociological principles. Examples of such default policies include calls from superiors being more important than calls from subordinates, someone alone in an office being more available than someone with several visitors, calls with a subject related to a user's current activities being less intrusive than calls with unrelated subjects, etc.

Once the user context has been updated with call specific information in block 19, the feature to be performed is selected in block 21. Feature selection policies block 21 utilizes the evidence generated previously in block 19 to direct call handling in accordance with policies set by the user governing the personalized call handling he/she expects. These policies indicate how calls should be handled for differing role relationships, time of day, user state, user location etc. According to applicant's counterpart granted U.S. Pat. No. 2,351,870 filed Jul. 9, 1999 and issued on Sep. 19, 2001 entitled Feature Interaction Resolution Using Fuzzy Rules, block 21 uses forward chaining with fuzzy reasoning to generate priorities among all proposed features and relates that to the intrusiveness of the proposed actions. This results in the selection of a single feature as being the most appropriate for call handling given the declared personalized preferences of the user. The feature is then executed, as shown at block 23.

The execution of features at block 23 can be modulated as described in Applicant's co-pending application entitled "Processing by use of synchronized tuple spaces and assertions", U.S. Ser. No. 11/471,742, filed on Jun. 21, 2006 and incorporated herein by reference, to allow external features acting as enterprise constraints to control the execution of the selected feature.

Thus, with the new addressing capabilities of Internet-based telephony, features can take on new semantics. Instead of remaining at the device level as in conventional telephony, features can operate at a personal level. Calls are not directed to physical endpoints but rather to aspects of the user's identity within his/her business context. A user may have multiple aspects to his/her identity, each of which has different capabilities in the business environment. For example, a user may have multiple aspects to his identity in the form of:

Voice mail box for messages that do not need current attention.

Secretary or equivalent function that can use mechanisms outside of call processing to make routine decisions about call disposition and other matters to shield the user from interruption.

Identities that represent the user in distinct current projects Etc.

These multiple identities may be carried directly in URLs that convey meaning in respect to aspects of the user's identity using the standard "dot" convention. Thus, a user named John Doe may have multiple aspects of his business identity specified as:

secretary.john_doe@example.com
    personal.john_doe@example.com
    voice-mail.john_doe@example.com
    project.sub.--3499.john_doe@example.com This change in convention effectively creates an entirely new model of how telephony features operate in converged voice and data systems. As indicated above, features in the present system operate with an understanding of the current user context and communications are directed to the most appropriate aspect of the user identity. Thus, for example, calling parties can indicate which aspects of the identity they wish to contact and which aspects-they-do-not wish to deal with.

Figure 3:
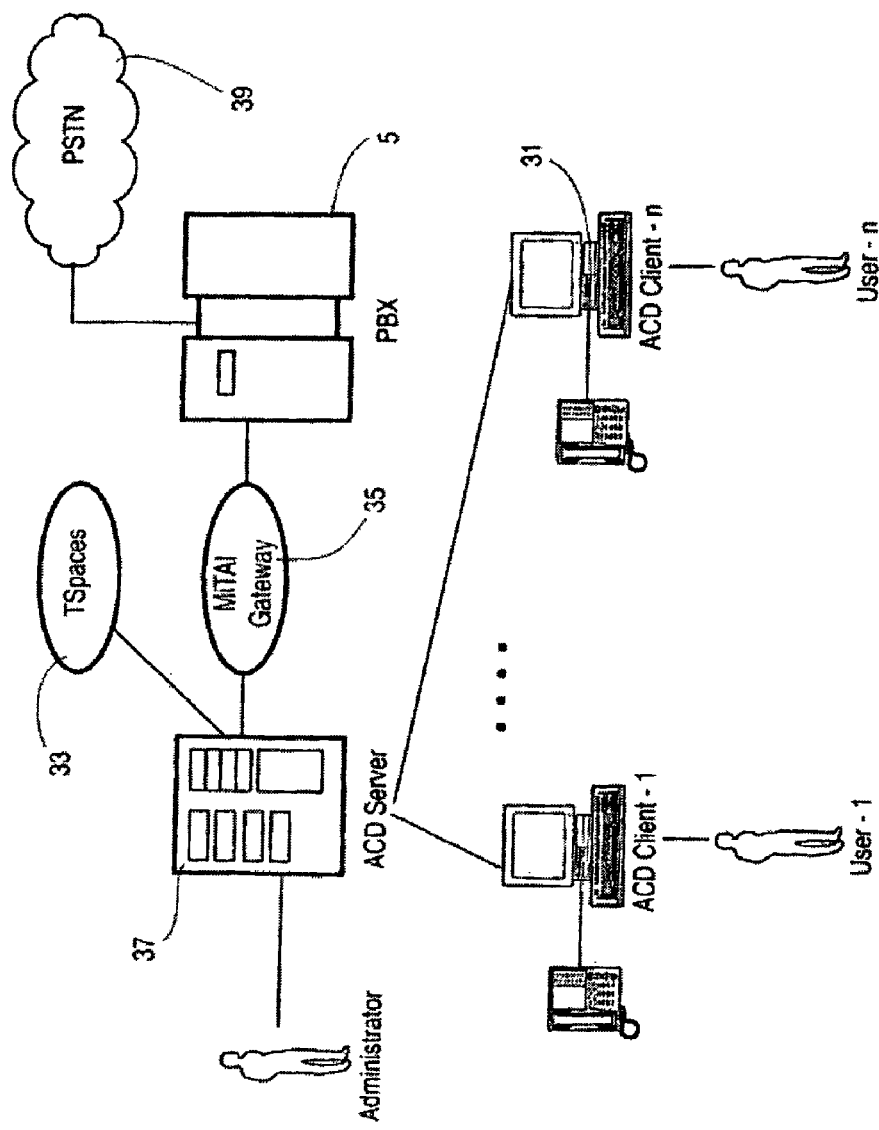
FIG. 3 is a block diagram of a hardware implementation of the system of FIG. 2.

An exemplary hardware implementation of the contextual call handling system is shown in FIG. 3. The system is based on a client-server architecture. An Active Call Delivery (ACD) client 31 communicates with an ACD server 37 which, in turn, communicates with TSpaces server 33 and a MiTAI Gateway server 35 from Mitel Corporation, 350 Legget Drive, P.O. Box 13089 Kanata, Ontario Canada K2K 2W7. The MiTAI Gateway server 35 is connected to PBX 5 which, in turn, communicates with the PSTN 39. ACD server 37 is a single server or multiple servers having access to the TSpaces server 33. The ACD server 37 consists of user interfaces and a collection of "system agents" discussed in greater detail below. The user interfaces provide an introduction window, a login window for a system administrator, a context window for managing a hierarchy of contexts and a call simulation window for simulating a phone call. Each system agent contributes to call processing and has its own responsibilities: a Relationship Assigning (RA) agent is responsible for acquiring the relationship between a caller and a receiver, and assigning it to a relevant data field for call processing. A User Rule Assigning (URA) agent is responsible for extracting all of the matching user rules according to the conditions of each rule and the current context, and assigning them to a relevant data field for call processing. A User-rule Conflict Resolving (UCR) agent is responsible for resolving any conflict that might be present in the assigned rules. As indicated above, these agents do not have to be installed on a particular machine, but can be distributed over a network of machines, which have access to the TSpaces server 33.

The ACD client 31 consists of user interfaces and user agents. The user interfaces provide an introduction window, a login window for a registered system user, and a registration window for a new user. Knowledge management is an important part of the user interface on the client system. A user can create or manage personal information such as a buddy list, relationship information, a schedule and a user preference rule. The client server utilizes two types of agents: The Call Delivery (CD) agent and the System Management (SM) agent. The CD agent acknowledges events, which are generated by the Call Monitor, in the Tspaces server 33. The Call Monitor is a direct interface with the MiTAI Gateway 35, and creates an event that is fed into the TSpaces server 33 for starting call processing by the CD agent. Next, the SM agent acknowledges the event from the CD agent, and distributes the call processing to agents on the network. Although each agent has distinct services, both the server and the client have certain common modules as per customary object-oriented design. These common object modules and the other modules are explained below.

Figure 4:
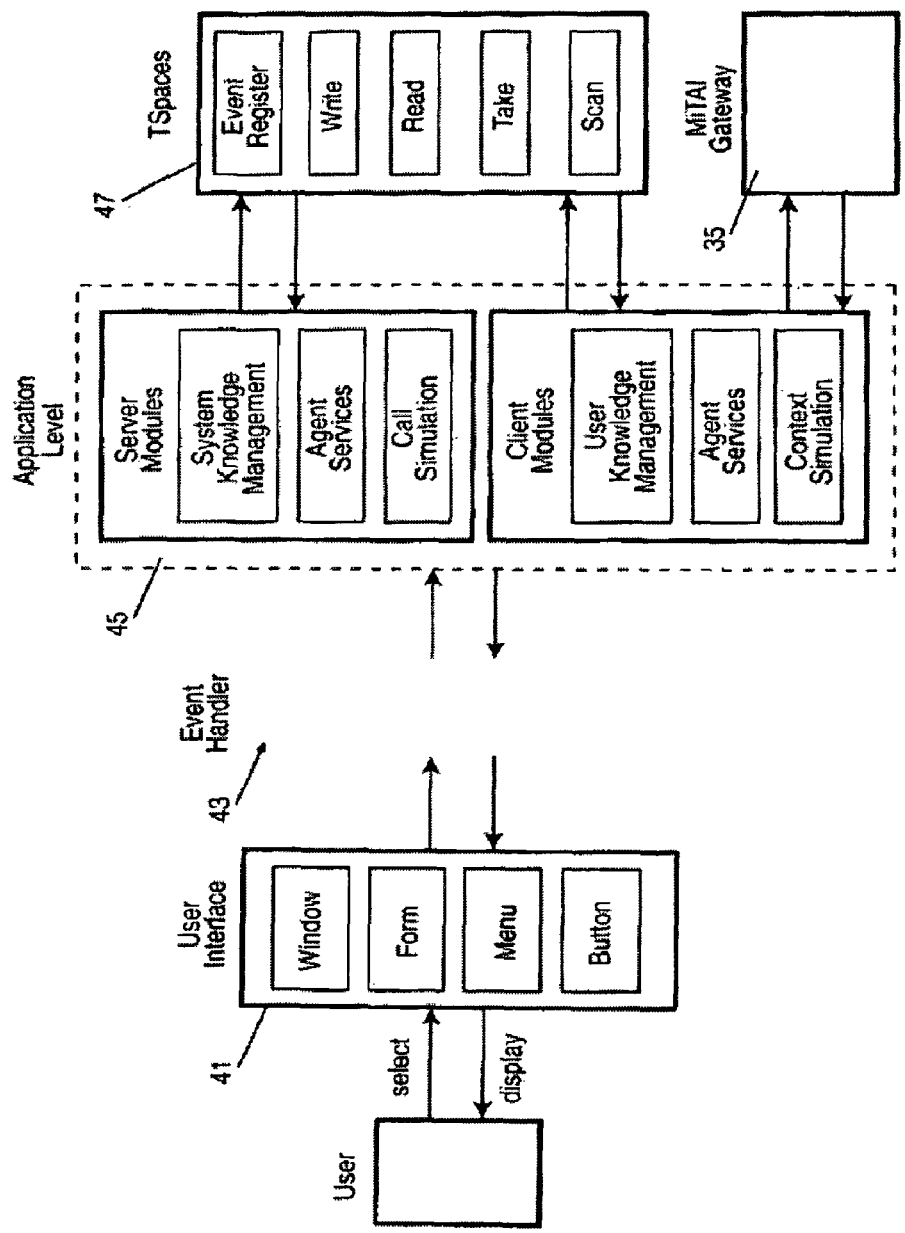
FIG. 4 shows the system architecture and module interactions for the system of FIGS. 2 and 3.

FIG. 4 shows the system architecture and module interactions for the Internet telephony system of FIGS. 2 and 3. The user interface 41 consists of windows, forms, menus and buttons for providing user login, registration, user preference rule setting, context simulation, and a display of messages for assisting the user.

The Event Handler subsystem 43 is a monitoring daemon that resides between the user interface 41 and the Application Level subsystem 45. It waits for physical events to arrive from the user interface 41, such as mouse clicks, and directs them to the appropriate application module. The development tool, Java, provides embedded event handlers, such as ActionListener, for this purpose.

The Application Level 45 is the core of the system. It consists of multiple agents that provide services for a client as well as for a server. All of the system transactions, functionalities, and knowledge management are performed within this subsystem.

Figure 5:
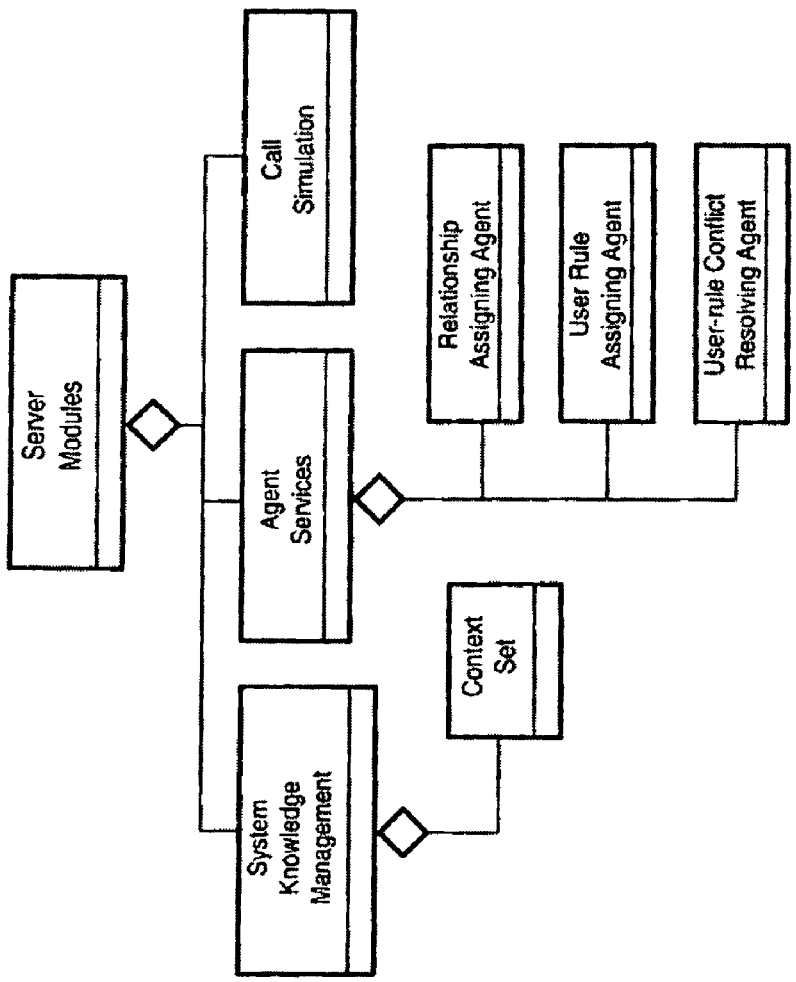
FIG. 5 is a class diagram for the server modules of FIG. 4.

As shown in the class diagram of FIG. 5, the server modules are divided into three major parts: System Knowledge Management, Agent Services and Call Simulation. The System Knowledge Management module includes a Context Set sub-module to allow an authorized administrator to create or modify a context hierarchy such as location and activity. The Agent Services module consists of three distinct agent modules: The Relationship Assigning (RA) agent, the User Rule Assigning (URA) agent, and the User-rule Conflict Resolving (UCR) agent. In order to give flexible implementation of the agents, status of the agents is managed in order to know their availability. Network connectivity may affect their availability. Therefore, both an agent and the connection between the agent and the system's TSpaces 47 (FIG. 4) must be functional in order to use the agent. The system acquires agent's status by examining a corresponding status tuple in the TSpaces 47. The status tuple consists of "name", "priority" and "availability" fields. Each agent is responsible for updating its status tuple in the TSpaces 47. The procedures for updating a status tuple consist of taking the status tuple and rewriting it with new status information once per second. A tuple can be set to expire after a predetermined time. Upon expiration, the TSpaces server 33 removes the tuple from the TSpaces 47. The expiration time for a status tuple is three seconds, so if an agent fails to update the tuple three times consecutively for any reason, there will be no status tuple for the corresponding agent in the TSpaces 47. The system assumes that an agent is abnormal if there is no status tuple for the agent, or if the "availability" field in the status tuple is set as "abnormal". The time gap between the one-second it takes to update the status tuple and the three seconds allowed before the status tuple expires may prevent unnecessary status toggling by temporal network disturbance.

Each agent is also responsible for registering an event into the TSpaces 47 to communicate with client machines. Whenever an awaited tuple is written into the TSpaces, the TSpaces server 33 notifies this to an agent that registered the event. Generating an event and getting notification of the event from the TSpaces 47 forms a two-way communication-acknowledgement between agents.

The Relationship Assigning (RA) agent is responsible for responding to a relationship-assigning request from a client's SM agent. The request from a SM agent contains caller and receiver information. The RA agent assigns the relationship between the user and the caller according to the user's buddy-list.

The User Rule Assigning (URA) agent is responsible for responding to a user-rule-assigning request from a client's SM agent. Upon request, the URA agent retrieves both the relationship information and the user's current contexts. The relationship information is a relationship between the caller and the receiver, set by the RA agent. The user's current contexts are the user's location, the current time with the user's schedule, and the user's activity.

Who is calling?
Where is the user?
What the user is doing?
When is it?

The User-rule Conflict Resolving (UCR) agent is responsible for responding to a client's SM agent for the user-rule conflict-resolving request. The request contains user rule information that is assigned by the URA agent. The UCR agent selects one rule that is the most specific among the assigned rules. The more conditions a rule has, the more specific a rule is considered to be. The Call Simulation service is provided for testing without connecting to a MiTAI Gateway 35. A window with a form serves this functionality.

Figure 6:
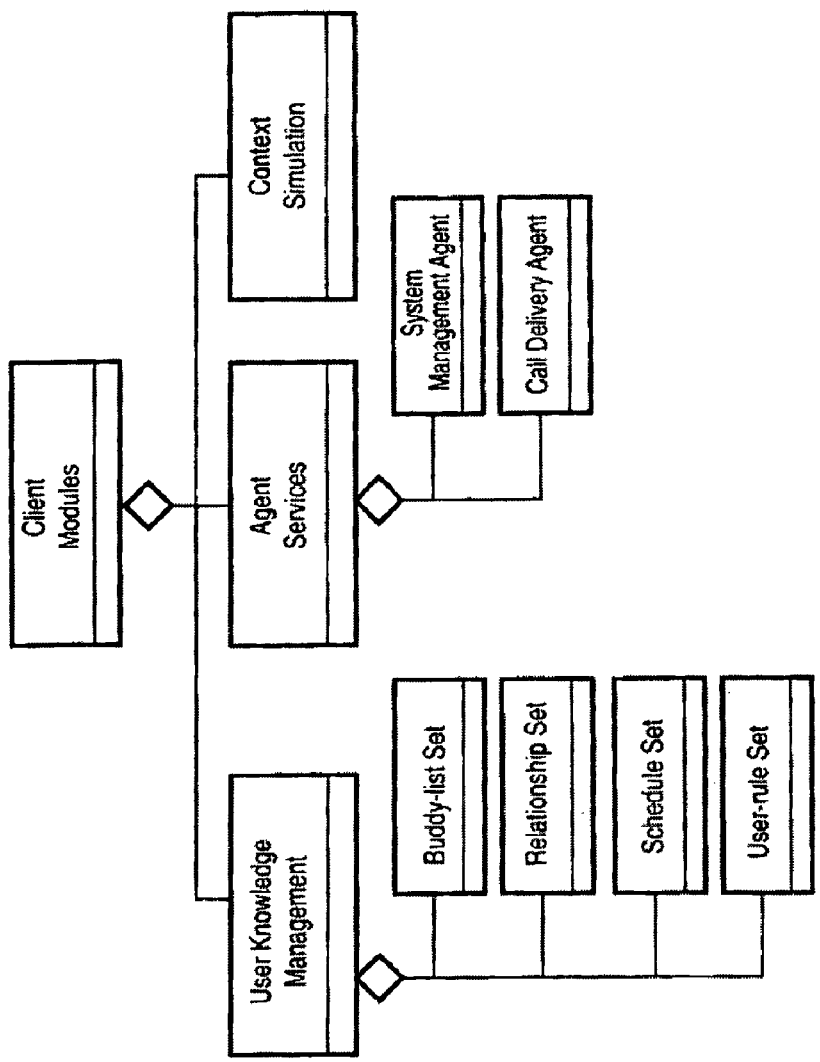
FIG. 6 is a class diagram for the client modules of FIG. 4.

As shown in the client module class diagram of FIG. 6, the client modules are divided into three subsystems: User Knowledge Management, Agent Services, and Context Simulation. A user can manipulate personal knowledge through the User Knowledge Management module.

The Call Delivery (CD) agent is responsible for communication with the phone switch or PBX 5 through MiTAI Gateway 35. In particular, the CD agent registers events to MiTAI Gateway 35 and waits for the notification of an incoming call for a user. When the notification arrives, the CD agent sends a request to the SM agent for further processing and waits for response. This response from the SM agent contains an action to be taken as a result of an entire call processing. Then the CD agent is responsible for requesting the selected action to the MiTAI Gateway 35.

The System Management (SM) agent is responsible for managing other agents' status and sequencing call processing according to the system agents' priority. When the CD agent requests call processing, the SM agent scans the agents' status tuples in the TSpaces 47 and makes a sequence table according to their priority. It sends a processing request to the highest-priority-agent, waits for a response and then sends it to the next-highest-priority-agent. When the SM agent receives a response from the lowest-priority-agent, it sends an information tuple back to the CD agent.

The Context Simulation module serves as a context agent that dynamically detects, interprets and updates the user's current contexts. A Context Simulation window includes all of the possible contexts, which are set by a system administrator, and a user selects from them.

TSpaces 47 (i.e. tuple spaces), are implemented in one or more servers 33 as a network communication buffer with database capabilities. A more complete description of TSpaces 47 may be found in Applicant's co-pending application U.S. Ser. No. 11/471,742. TSpaces 47 enable communication between applications and devices in a network of heterogeneous computers and operating systems. TSpaces 47 provides group communication services, database services, URL-based file transfer services, and event notification services. The TSpaces 47 are implemented in the Java programming language and thus automatically possess network ubiquity through platform independence, as well as a standard type of representation for all data types. The TSpaces system is appropriate for any application that has distribution or data storage requirements. It can perform many of the duties of a relational database system without imposing an overly restrictive (and primitive) type system, a rigid schema, a clumsy user interface or a severe runtime memory requirement. In present embodiments, the TSpaces Server 33 is the medium between the system and user knowledge stores. However, it will be understood that Tspaces 47 may be replaced by a relational database or other shared database providing equivalent functionality for managing knowledge transactions, including read, write, update, take and scan, as well as event handling, such as registration and notification of events.

The MiTAI Gateway 35 facilitates communication to the MITEL telephony servers (i.e. PBX 5) for processes that are not based on the "C" development language. However, the MiTAI Gateway 135 is not particularly limiting, and any suitable gateway that performs a similar function is within the scope of present embodiments. The MiTAI Gateway 35 is a Windows based process that can be executed on any Windows platform. It can manage a single socket connection from any other process on a network and it supports a limited session protocol.

The MiTAI Gateway Server 35 is the intermediate system between the PBX 5 and the ACD's Application Level subsystem 45. The Application Level subsystem 45 registers an event to the MiTAI Gateway server 35 for the purpose of monitoring incoming calls.

In terms of system topology, the User Interface 41 is built on a Windows Platform, and it interacts with the Application Level 45 through an Event Handler 43. The Application Level 45 subsystems use TSpaces server 43 as the medium for communication and for accessing the System Knowledge Management of the server and clients.

All of the knowledge, which includes user information, user rules, the user's current context information, and call information, is stored in the TSpaces 47. The unit of storage is a tuple, as set forth in the references cited above, and as discussed in the Appendix to this specification.

User Information consists of basic user information, relationship information, a buddy list, user preference rules and the dynamically varying user's current context information. User Information is stored in a tuple named "UserProfile" and the structure is as follows:

{"UserProfile", id, user-info, relationship, buddy-list, user-rule, context} where "UserProfile" is the name of the tuple, id is user identification for uniquely identifying a user in the system. The user-info field contains basic user information about the user such as: password, name, phone numbers, and the user's time schedule. The phone numbers are extension phone numbers within the PBX 5, such as my office and secretary's phone numbers (e.g. 4001). This field also contains the schedules of the user. Schedules for lunches and meetings may be input by the user directly or ascertained from another application (e.g. Microsoft Outlook, etc.). The relationship field contains relationship information which is defined by the user in a relationship hierarchy using the user interface. The user can add any person as his "buddy" in a buddy list. The buddy list contains information about such persons including as name and phone number, as well as their relationship to the user. The user-rule field contains a user preference rule. The user creates his/her personal preferences for handling incoming calls via the user interface 41. The conditions in a rule can make use of the contexts, the buddy list and a relationship selected from the relationship information hierarchy. In that regard, the context field contains context information. The context determining parameters, which are used in the system, are location, the user's current activity and the present time. The location and activity contexts have a hierarchy, so that they may have sub-contexts. The current context information of a user can be either a real context or a pretended context set by the user. The real context information is updated by the context agent(s) whereas the pretended context, on the other hand, is set and controlled by the user. The pretended context is designed to override the real contexts if so desired by the user. The hierarchy of the location parameters is defined by a system administrator. Thus, if a location's properties are coupled with the phone number, the system can deliver the user's call to the phone nearest to the user's current location.

There are two kinds of activities that can be defined. Some activities can be automatically detected by the system, whereas others can only be assumed or set by a user. For example, the system is able to know whether the user is "on the phone", but it is difficult to judge if the user is "busy at work" or "having a break". Therefore, detectable activities are updated by the system automatically, and others are set by the user. A receiver's time context is set according to his time schedule. For example, if the user's lunchtime is scheduled from 12 p.m. to 1 p.m., the system can assume that the user is having lunch during that time period.

Call information is contained in a tuple that an agent shares to communicate with other agents for processing an incoming call. Therefore, it contains all of the necessary data fields for caller information and user preference rules. Agents take the "Call" tuple from the TSpaces 47 and update it according to their responsibility. For example, the RA agent assigns relationships between the caller and the receiver, the URA agent assigns all the appropriate user rules, and the UCR agent resolves user rule conflict by selecting only one user rule. The form of this tuple is:

{"Call", dest-agent, source-agent, id, call-info, user-rule} where "Call" is the name of the tuple, dest-agent is the destination agent that is expected to receive this tuple, the source-agent field identifies the source agent that sends this tuple, the id field is user identification, and the call-info field contains basic information of both the caller and the receiver such as phone number, name and relationship information between them. The user-rule matches user rule(s) assigned by the agents. The "Call" field and the dest-agent field are used when agents register an event in the TSpaces server 33. The following is a part of the SM agent event registration routine to the TSpaces server 33:

```
Tuple template=new Tuple("Call", "SMAgent", new Field(String.class),
        id, new Field(String.class), new Field(String.class),
        new Field(String.class));
seqNum=ts.eventRegister(TupleSpace.WRITE, template, this,
    newThread);
```

It requests the TSpaces server 33 to notify the SM agent when a tuple is posted where the first field is "Call", the second is "SMAgent", and the fourth is user id, and where the third field is "new Field(String.class)" which means that any value will be acceptable for this field.

Having described the basic structure and operation of Applicant's contextual call handling system, the following is a description of detailed component interactions according to present embodiments. This description is set forth in terms of a SIP based system, since SIP is now and likely will remain the dominant protocol for IP telephony. Although the example used refers to SIP, someone skilled in the art will appreciate that the example can be extended to any call set up protocol.

According to present embodiments, standard SIP is used with the addition of a Hypothetical header. As with standard SIP, the header is text based, containing one of two values: YES or NO. A "YES" in the Hypothetical header indicates that the INVITE message is a request for availability. An INVITE message with either no hypothetical Header or with a header value of NO indicates a normal Invite.

In operation, the hypothetical call operates the same way as a normal SIP INVITE. However the INVITE is interpreted as a request for a continuous indication of availability. When a user's availability changes with respect to a user, a SIP NOTIFY message is sent to the subscriber which contains a payload with the new availability information. In keeping with standard SIP, the availability indication remains in force until the subscribing user terminates the session with a BYE message.

As discussed above, the Call Delivery (CD) agent handles incoming requests for calls (including requests for "hypothetical" calls to provide a continuous indication of availability). The CD agent presents the received information to the rest of the contextual call handling system for a decision on disposition, and then executes that decision by signaling the external system (i.e. PBX 5). More particularly, the Call Delivery agent extracts the pertinent information describing the call and posts the information in the tuple space 47 for use by other system agents. Similarly, in the case of hypothetical calls, the CD agent extracts the information from the incoming message and places it in a queue (i.e. a queue of hypothetical requests in either the tuple space or within the CD agent itself) with other hypothetical calls. The contents of each item in the queue are:

a) the identity of the subscriber (from the FROM header on the incoming message);

b) the parameters describing the call that it has extracted from the message; and c) the previously determined availability of the user—(i.e. available, unavailable, or not yet determined).

When the subscription (i.e. information) is first placed in the queue, the value of the availability information will be set to "not yet determined". When not in the process of handling a normal call request, the CD agent steps though the queue of hypothetical calls and presents them to the rest of the system as it would a normal call.

According to present embodiments, the following additional modifications are provided to the contextual call handling system of Applicant's co-pending application, U.S. Ser. No. 10/631,834, the additional modifications described in Applicant's co-pending application "Generation of Availability Indicators from Call Control Policies for Presence Enabled Telephony System", U.S. Ser. No. 10/631,747, filed on Aug. 1, 2003 and incorporated herein by reference:

a) Rules can be created by the user that incorporate contextual features to describe availability and in response generate indicators of fuzzy availability. Along with the rules that determine call handling suggestions, these rules are executed in the User Rule Assigning Agent (URA).

b) The rules in the UR agent that decide specific handling of calls are extended to give an indication of the availability that the decisions indicate. Thus, rules that direct the call to the user will show "available", away from the user will show "unavailable" and rules which ask the user will show "no decision".

c) The Conflict Resolving (CR) agent is modified to generate crisp indicators of availability from the generated indicators of fuzzy availability in conjunction with specific decisions on call handling. The CR agent accepts the decisions of the specific call handling rules as definitive. In any case in which these rules cannot make a decision, the CR agent composes the fuzzy indicators to produce a crisp indicator.

The availability rules operate in the same manner as the rules described in Applicant's co-pending application U.S. Ser. No. 10/631,834. These rules take into consideration the call specific and contextual factors that have been placed into the tuple space 47 to generate fuzzy indicators of availability. The fuzzy values of availability are:

Not Available
Not Very Available
Somewhat Available
Available
Very Available

These fuzzy indicators are ascribed values ranging from 0 (Not Available) through 4 (Very Available).

The rules are of the form:
If I am in my office and the call is from my boss then I am Very Available
If the time is lunch time then I am Available This additional capability of present embodiments allows the user to set up general rules to indicate his/her availability based on the same factors (e.g. time, location, sender etc.) as discussed in Applicant's co-pending application, U.S. Ser. No. 10/631,834.

As discussed above, each of the availability rules operates in the UR agent (User Rule Assigning Agent) and each rule supplies its results to the Conflict Resolving agent. The results given by a rule are of the form:

Unique Identifier for Rule
Value of Availability
List of the Factors that were considered by the rule (i.e. the list of items from Table 1, described below).

The availability rules that are triggered by a hypothetical request all place answers in the tuple space 47 where they are retrieved by the subscribing Conflict Resolving (CR) agent.

According to a further aspect of the embodiments, a mechanism is provided to combine the fuzzy returned values into a crisp indication of availability, to avoid conflicts among the use of certain factors. For example, a user may have created a rule that says that he is very unavailable between 1 p.m. and 3 p.m. but is very available to members of a certain project at anytime. The problem arises as to what indication of availability should be gathered for the factor of time. In one case, the time factor indicates unavailability and in the other case it indicates availability. In the preferred embodiment, the conflict is resolved by using only the most specific rule in which the factor is involved, as determined by a count of the number of factors involved in the rule—the rule with the most factors being considered to be more specific and thus more relevant. When it is not possible to select one rule among conflict rules, the system either selects the most recently created rule or simply chooses a rule at random (or randomly chooses a rule in the event of a tie among most specific rules). The use of the specific rules in call handling for availability decisions solves the problem of compatibility between availability rules and call handling rules discussed above.

In operation, the CR agent is supplied with a number of availability indications, as discussed below. Each of these is given a name and contains the identities of the other factors and rules that were used in the evaluation of the rule. The number of other factors gives an indication of the specificity of the rule.

The specificity of a rule is the number of factors that it returns as being considered in rule evaluation. In operation, the following steps are repeated for all returned availability indicators:

1. For each of the supporting factors in the rule, examine the table for an entry for that factor.
2. If a table entry does not exist for the supporting factor create it with the specificity value set to 0.
3. If the specificity of the supporting factor table entry is less than or equal to the specificity of the current rule, replace the availability value with the availability value of the current rule and replace the specificity value with the specificity value of the current rule.
4. If the specificity value of the supporting factor table entry is equal to the specificity value of the current rule, then replace the current availability value of the supporting factor table entry with the average of the availability average of the current rule and the current availability of the supporting factor table entry.
5. Repeat this until all returned availability indicators for this rule have been considered.
6. Repeat for all rules.

The operation of the CR agent with respect to the composition of returned indicators from the availability rules is as follows. It starts with a pre-populated (or alternatively empty) table of the form shown in Table 1.

TABLE 1

| Factor Table | | |
| --- | --- | --- |
| Factor | Specificity | Availability |
| Location | 2 | 2 |
| Time | 5 | 4 |
| Activity | 3 | 4 |
| Call Type | 3 | 3 |

To see how the algorithm works, consider the example of the following rule being fired and being composed with the values as shown in Table 1:

If I am in my office and the call is from my boss and the call type is work then I am Very Available There are three factors in this rule: location (office), call relationship (boss) and call type (work). Thus the rule has a specificity of 3.

Taking the first factor of location, the specificity value of the rule (3) is compared with the specificity value (2) currently in the table.

Since the current rule value (3) is greater than the current table value, both the table value for specificity and availability are updated with the current rule values resulting in the values shown in Table 2:

TABLE 2

Factor Table after Location

| Factor | Specificity | Availability |
|---|---|---|
| Location | 3 | 4 |
| Time | 5 | 4 |
| Activity | 3 | 4 |
| Call Type | 3 | 3 |

Next, the factor of relationship is considered. Since there is no row for that factor currently in the table, a row is created for it and the value for availability and specificity for the current rule are placed in it. This results in the values shown in Table 3:

TABLE 3

Factor Table after Call Relationship

| Factor | Specificity | Availability |
|---|---|---|
| Location | 3 | 4 |
| Time | 5 | 4 |
| Activity | 3 | 4 |
| Relationship | 3 | 4 |
| Call Type | 3 | 3 |

For the final factor of call type, the specificity of the current rule (3) is the same as the specificity value of the row in the factor table. Thus, from step 4, above, the availability value from the current rule (4) is averaged with the current value in the factor table and the result is placed in the table to create the result as shown in table 4:

TABLE 3

Factor Table after Call Type

| Factor | Specificity | Availability |
|---|---|---|
| Location | 3 | 4 |
| Time | 5 | 4 |
| Activity | 3 | 4 |
| Relationship | 3 | 4 |
| Call Type | 3 | 3.5 |

This foregoing methodology creates a table of the contextual factors that have been found by the rules to be relevant to the determination of availability. These factors may have been involved in multiple rules but as is noted above the most specific rule is the one that gives the best indication of availability. The factors are thus matched with the availability generated by the most specific rule that used them. The inventive method has the advantage of being more sensitive to the most specific rules since it is those rules that tend to spread their availability indications across the factors. More general or low specificity rules will tend to be supplanted by rules more suited to specific cases. The foregoing is but one method of composing fuzzy indicators of availability from rules. Others methods are possible, but the essential method of composition remains the same.

As a result of the foregoing method, a table is created containing the processed availability indicators derived from all of the relevant factors in the tuple space 47. A composite fuzzy value may be derived from the multiple table values by a variety of techniques, which include:
1. Maximum value;
2. Minimum value;
3. Arithmetic average;
4. Geometric average;
5. Specificity weighted average; and
6. . . .

For the present example it will be assumed that one of the averaging techniques is used to obtain a composite fuzzy value. This can be converted to a crisp fuzzy value by comparison against a standard value. Values above that level will be considered to indicate availability. Values below that level will indicate unavailability. The cutoff value may be biased high or low to facilitate either optimistic or pessimistic opinions on availability.

As an example of this process, and taking the values indicated in Table 4, calculating a specificity weighted availability average yields a value of:

$$(\text{Sum for all factors (specificity} * \text{availability)})/$$
$$(\text{Sum for all factors(specificity)}) \text{ or}$$
$$((3*4)+(5*4)+(3*4)+(3*4)+(3*3.5))/(3+5+3+3+3) =$$
$$(12+20+12+12+10.5)/17 = 66.5/17 = 3.91$$

Assuming that a comparison value of 2.5 had been chosen with all values at or above that being considered to mean available and all values below that being considered to mean unavailable, a comparison is made between the composite fuzzy value of 3.91 and the comparison value of 2.5. The derived crisp value of availability in this example therefore becomes "available".

In summary, call handling rules in the system according to present embodiments operate in the same way as set forth in Applicant's co-pending application U.S. Ser. No. 10/631,834, with the exception that each of the suggested actions also contains an indication of availability. Thus, calls that are directed to the user will have an availability indicator of "available", away from the user will have an indicator of "unavailable", and ask the user has an indicator of "not yet determined".

Both the availability rules and the call handling rules provide a crisp indicator of availability. The call handling rules predominate since they result in specific actions. If they specify either "available" or "unavailable", the value will be returned to the Call Delivery agent. If the call handling rules indicate availability "not yet determined", the crisp availability determined from the availability rules will be returned to the CD agent.

The Conflict Resolving agent returns the value of availability it has determined for the hypothetical call to the Call Delivery agent. The CD agent examines the value of availability for the call already stored in its queue. As stated above, any one of three values is possible ("available", "unavailable" or "not yet determined" (the hypothetical call message has just been received). If the returned availability is different than the stored availability, the stored availability is updated with the new value and a NOTIFICATION message is sent to the subscribing party informing him/her of the new message.

Figure 7:
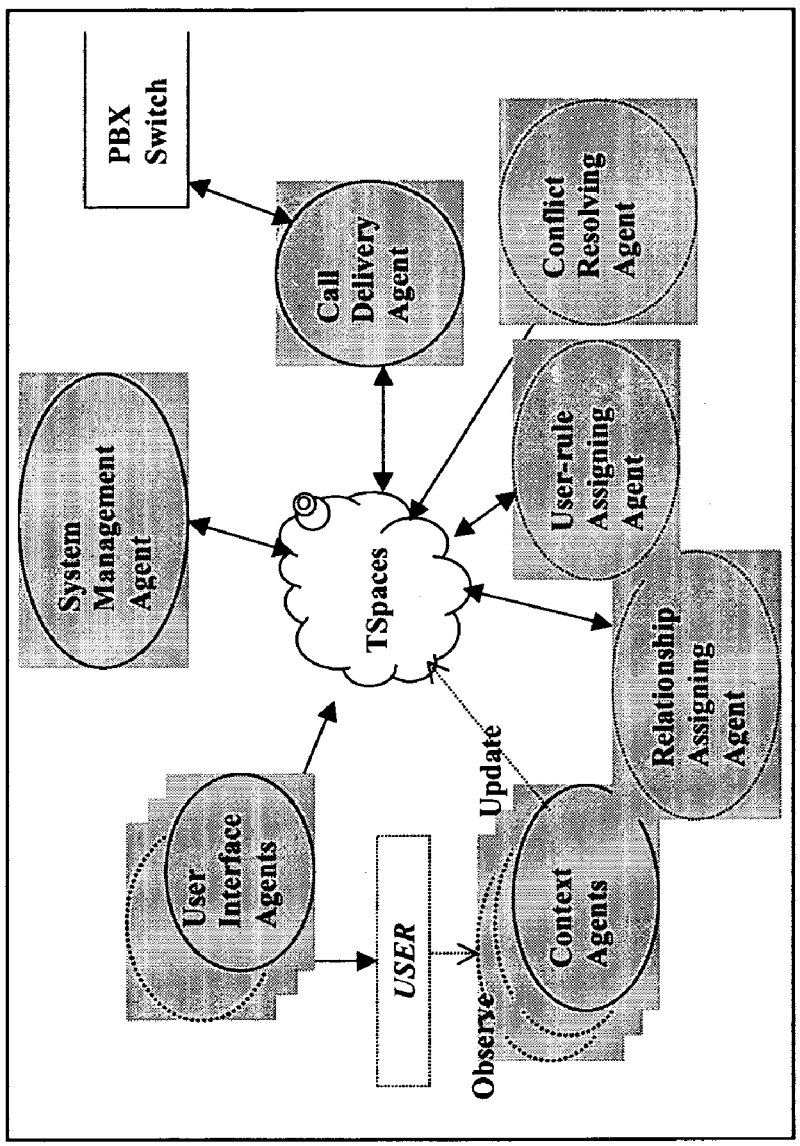
FIG. 7 depicts a block diagram of an agent based view of the system of FIG. 3.

Referring now to FIG. 7, which depicts a block diagram of an agent based view of the system of FIG. 3. Context agents will monitor a user context (where he his, who he is with, what he is doing . . . ) and make assertions about this to the tuple space. On the occurrence of an incoming call, other agents will utilize information provided with the call (caller id, call subject etc.) and place this call within the user's current context. Other agents will then use either specific rules that the user has provided, as described above, generic rules that apply to common enterprise situations (boss or VIP customer calls for example) or specific enterprise rules to decide on the most appropriate call handling. Hence a system is provided for sensing user context and making decisions about the most appropriate means to handle incoming calls.

The basic architecture of the system depicted in FIG. 7 is that of a blackboard implemented with the use of the IBM TSpaces tuple space. Agents interacting though the blackboard will handle incoming calls. Multiple agents serve the user. Context agents will sense the user's current environment (both physical and social) and make surmises about the user's current context. In some embodiments it is assumed that the locations of all users are sensed. Additionally there will be agents who have access to company organization charts, personal address books, personal preference libraries etc. These agents will act through policies and other techniques to make surmises about the users current activities within the organization. For example, by cooperating, the agents will be able to place assertions into the blackboard about a user's current co-presence (whom he is with), his activities and estimates of the current importance, urgency of his work, and other relevant data.

Agents handle individual calls as they come in. The agents will attempt to fit the call into the user's current context and decide which feature is best suited to handle the call given the user's current context and preferences. The system is connected to a PBX (for example a Mitel SX200D from Mitel Corporation, 350 Legget Drive, P.O. Box 13089 Kanata, Ontario Canada K2K 2W7) by a Computer Telephony Integration (CTI) system (e.g. a Mitel MiTAI in one non-limiting embodiment). The system will subscribe to call termination attempts for each user. On receipt of such an event, the System Management Agent (SMA), which acts as a sequencer, will trigger the other agents to handle the call. Firstly the Relationship Assigning Agent (RAA) will take any information that it can obtain about the call. The Call Delivery Agent (CDA) will have entered all available information into the blackboard. On termination of the RAA's work the User-rule Assigning Agent (UAA) will apply its policies to determine which user defined features have been made applicable to the current call. Typically more than one incompatible feature will apply and so the Conflict Resolving Agent (CRA) will use internal policies to resolve the conflict and select the most appropriate feature. This will be supplied to the CDA which will instruct the PBX (and possibly other devices) to perform this feature.

Figure 8:
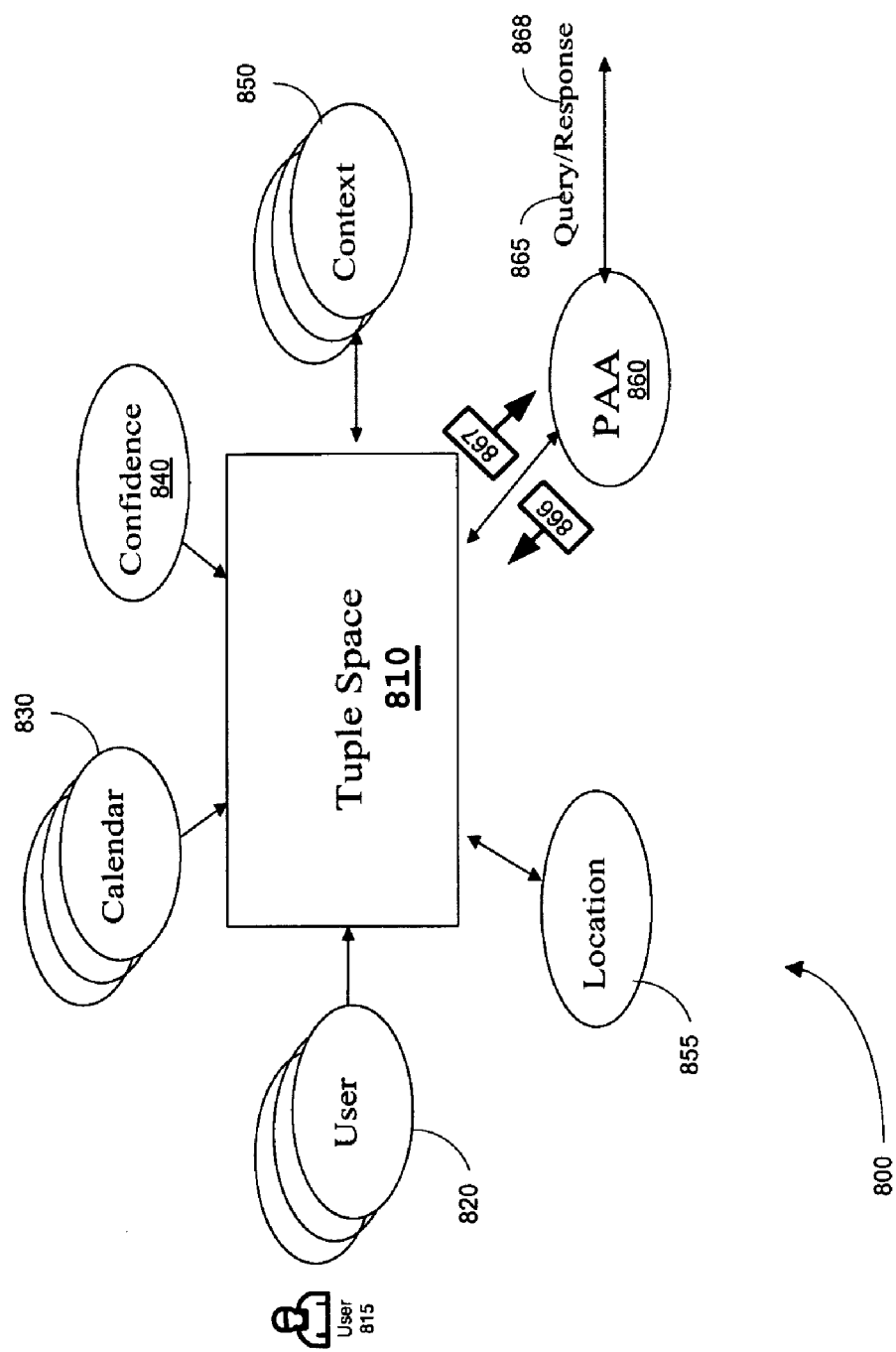
FIG. 8 depicts a block diagram of a prospective availability system, according to a non-limiting embodiment.

Attention is now directed to FIG. 8 which depicts a block diagram of a prospective availability system 800. System 800 extends the architecture system depicted in FIG. 7, by adding new functionality to some existing agents and adding some new agents in order to supply proactive availability information to clients.

Within the system 800, a tuple space 810 will be updated by agents, described below, to create a model of an enterprise (e.g. a business) associated with the tuple space 810. Agents will monitor the tuple space 810 and act on the information that may be found there. The agents are also enabled to detect events in the enterprise (described below) and make assertions about the individual contexts of all users associated with the enterprise, such as a user 815, to create an overall model of the enterprise context.

Various agents will have access to various evidentiary sources that can be used to make surmises about future availability. Examples of evidentiary source include, but are not limited to:

1. Contents of a user's calendar
2. Contents of other users' calendars
3. Socially aware observations and surmises from the user's current context
4. User declarations The architecture of FIG. 8 has been constructed to be able to cope with an indefinite number of evidentiary sources.

Each of these evidentiary sources (both listed above and others which may occur to one of skill in the art) may be used to generate estimates of a user's availability. Agents making estimates will supply an estimate of its reliability to the service. The service will make a decision based on criteria, such as those described above, and return a best guess as to a user's proactive availability along with the reliability estimate.

The assumption is that policies that can determine the called party's availability in respect to the caller are operative, similar to that described above. It is these policies which have decided that the user is not available for the requested call to the calling party. This determination is based on the user's call processing and specific availability policies and is based on the currently extracted context. The system 800 then determines when the user will next become prospectively available to the caller.

In some embodiments, as described below, a user's location may be determined, potentially down to the resolution of a room. With this capability, the user's co-presence (who he is with) may also be determined. This information can be used by the policies in the call processing system and to be thus available to the prospective availability system 800.

There may be variations in the nature and the quality of the information sources that will be available. The blackboard architecture allows the analysis of the various information sources to be encapsulated in separate agents. Each of these agents will be able to place its best estimate of the user's prospective availability onto the blackboard. Each agent is able to give an estimate of the degree of confidence that it has in its estimate. An agent (not depicted) akin the Conflict Resolving Agent of FIG. 7 will be able to resolve the discrepancies between these agents and provide the caller with the best guess.

The system 800 comprises user interface agents 820 enabled to display and present information to users. The user interface agents 820 will further allow users to provide an indication of their proactive availability or to indicate preferences for options that may be available during a call attempt.

In specific non-limiting embodiment, the user interface agents 820 are enabled to present a text page to a user on which can presented a variety of action options. These can include accepting calls, forwarding calls to voice mail, sending a message to callers to ask that the caller wait a moment etc. Once a user chooses at least one option, a caller may be presented with a message informing the caller of the intentions of the user, for example via call announcement/IVR features in telephone systems, such as IP based telephony systems. In addition, the text page can provide the option of indicating the prospective availability of the user. In operation, the user will be presented with the options. If the user selects the prospective availability option, the agent which is driving his screen will place this assertion onto the blackboard. A very high degree of confidence will be given to this estimate because it comes directly from the user in response to a specific query.

Users may also be given the capability to create an indication of their present prospective availability. This may be a specific statement that will be kept on the blackboard for the duration of time that the present prospective availability is active. For example, this could be used to indicate vacations, travel etc. Since this estimate comes directly from the user, it will be given a high degree of confidence.

The system 800 further comprises context agents 850 enabled to monitor the activity of users. For example, the context agents 850 may determine where the users are, who they are with etc. and fit this data into the enterprise context, similar to agents described above with reference to FIG. 7.

The system 800 further comprises calendar agents 830 that provide the system access to user calendars and which can make assertions about the users stated location and activity. For example, the calendar agents 830 are enabled to access an appointment schedule in a calendar associated with a user to determine an expected location, context, activity and other elements of context associated with the user.

Some embodiments of the system 800 further comprise a confidence agent 840 enabled to examine the calendars accessed by the calendar agents 830 and compare the expected location, context, activity and other elements of context with elements which have been determined by the context agents 850. For example, the accuracy of users' calendars will vary greatly. Some people keep them very accurately and others use them rarely if at all. This will determine the credence that can be put in any estimation based on it. This estimate could be derived from the proportion of accurately recorded calendar information to the total amount of meeting information recorded. For example, the calendars consulted will make assertions about the present location of the user. This assertion can be tested against the current information from the location service. Extensive use of the calendar with the user being in few places not recorded in it will provide a high credence. Rare use of the calendar with a user often in unrecorded paces where he is not available will provide a low credence.

Hence, if the calendar information is inaccurate, the credibility of the calendar for its assertions about future meetings can be downgraded. If it is accurate then an estimate of credibility may be taken from an overall confidence measure that is generated for the calendar. The confidence agent 840 agent may then create a confidence (or credibility) value for all user calendars and associate the confidence values with the appropriate user calendars as assertions in the tuple space 810.

In some embodiments the system 800 further comprises a socially based estimator (not depicted). The socially based estimator comprises a set of heuristics that function with knowledge of typical behaviour of people within an office environment. For example, if a user is determined to be within a meeting room, an estimation can be made that the meeting will end within an hour. If the meeting has lasted over an hour the estimation that the meeting will end within an hour is likely poor and additional time may be added to the estimations. Estimates made by the socially based estimator may be supplemented with knowledge of lunch times, coffee breaks, hours of work etc.

However, as estimates from the socially based estimator are not based on any specific user policy, they will be given only a low degree of confidence, for example as a fall back estimate which may be used when other estimates are not available.

Some embodiments of the system 800 further comprise a location agent 855 for monitoring the location of a user (e.g. the user 815). In some embodiments, the location agent 855 interfaces with location devices associated with users, as described above and in a non-limiting example a global positioning system (GPS) device carried by a user, to monitor the location of users. In other non-limiting example, the location agent 855 interfaces with detectors enabled to determine the location of users (RFID (radio frequency identification) readers interacting with RFID tags carried by users, facial recognition detectors etc.), to monitor the location of users. In these embodiments, detectors may be installed at various locations in an enterprise to determine the location of users within the enterprise.

In some embodiments, the system 800 may have access to context aware buddy lists, for example as described in Applicant's co-pending application, "Architecture and Implementation for Control of Context Aware Call Processing with Local Feature Definition", U.S. Ser. No. 10/631,811, filed on Aug. 1, 2003 and incorporated herein by reference. An appropriate buddy list can be selected depending on the user context. This may either be done by manual selection via the user agents 820, or by use of the context agents 850. The buddy lists can be enabled to provide a specific indication of user proactive availability. For example, this can be a display showing the time of the next user availability, as well as an indicator to indicate that the information is available and can be obtained in an appropriate manner. Further, an indication of the confidence of the prediction may also be provided.

The system 800 further comprises a proactive availability service, which will be available to other services/clients through queries. The proactive availability service is embodied in a PAA (proactive availability agent) 860 which, on reception of a query 865, is enabled to place a request 866 into the tuple space 810 for the estimations of the other agents on the proactive availability of a specific user. This is analogous to what is done in Applicant's co-pending application U.S. Ser. No. 10/631,834 to select a call-processing feature. Agents which have an estimate of proactive availability (including but not limited to estimation algorithms described above, in reference to Applicant's co-pending application, U.S. Ser. No. 10/631,747) will present their estimates to the PAA 860 via a reply 867 from the tuple space 810. The PAA 860 will take the estimate with the most confidence and supply the estimate and its associated confidence value to the requesting service in a response 868.

In addition, in some embodiments, the PAA 860 may trigger a user query to the specific user to inquire about the proactive ability of the specific user, for example as to when the specific user may next be available. In one non-limiting embodiment, the specific user can be supplied with an interface that will allow him/her to make an indication of proactive availability. The indication will be returned to the tuple space via the interface, and the PAA will return this indication to the requesting application. In other non-limiting embodiment, the user query may comprise an e-mail, text message, phone call (for example via an IVR system), and the specific user may provide the indication to of proactive availability by replying to the e-mail, text message, phone call, as required. Other methods of querying the specific user as to proactive availability will occur to one of skill in the art.

In operation, an attempt to contact the user is made. In some embodiments, the attempt to contact the user comprises a request to communicate with the user at a given future time (e.g. 2 pm on the same day or a future date). In other embodiments, the attempt to contact the user comprises a request to immediately communicate with the user, for example a call to the user (e.g. a phone call via IP, SIP etc.). In any event, the query 865 is placed to the PAA 860, for example from a PBX. In embodiments where the attempt to contact the user comprises a request to immediately communicate with the user, the system 800 may then determine that the user is not presently available, using the techniques described above. In response to either the user being not presently available or a request to communicate with the user at a given future time, the PAA 860 will then issue the request 866 to the tuple space 810 for the estimations of the other agents on the proactive availability of the user. In embodiments where the attempt to contact the user comprises a request to communicate with the user at a given future time, the agents will use the given future time to determine prospective availability at the given future time, similar to the techniques described above.

In embodiments where the attempt to contact the user comprises a request to immediately communicate with the user, and it is determined that the user is not presently available (or alternatively where the attempt to contact the user comprises a request to communicate with the user at a given future time, and it is determined that the user is not available at the given future time), the request 866 from the PAA 860 will cause the agents to examine the user's appointment schedule to determine a time where the user is potentially available. In some embodiments this may be performed by the agents estimating availability for future temporal blocks in an appointment schedule, by applying availability rules to each future temporal block, similar to the techniques described above. In some of these embodiments, estimating availability may occur in temporal order. The management of the appointment schedule may occur, in some embodiments, via the calendar agents 830. To do so, the calendar agents 830 will query the calendar of the user and all other users for meetings in which the user may be involved. In some embodiments, this will occur for each future temporal block in the calendar, in temporal order of succession until a time is found at which the user will be available (described below). For example, if the calendar is arranged in 15 minute temporal blocks, each future 15 minute temporal block will be examined in temporal order. However, embodiments are not particularly limited by the size of the temporal blocks.

For each future temporal block in turn, the system 800 will gather the location, co-present personnel and/or any other pertinent information relevant to the user via the pertinent agents in the system. Each future temporal block will then be analyzed using the techniques described above (e.g. via availability rules including but not limited to fuzzy indicators of degrees of availability etc.) to analyze this information in terms of a hypothetical call attempt to determine the user's availability during each future temporal block. This process will continue until a time is found at which the user will be available, either because of a compatible meeting or with an open time slot. This estimation will be taken with common sense constraints on unsuitable times such as lunch hours, week ends, evenings etc. as described above.

The confidence in this estimate may be taken from the confidence obtained for the user calendar consulted. If more than one calendar provides information, then the calendar with the highest confidence will be used, as described above. The time at which the called user will next be available may then be returned to the calling user's equipment via the response 868. In SIP, this may be done in a SIP reply message. An announcement can then be made indicating the estimate of the user's proactive availability. Further the confidence in this estimate can be encoded in an adverb modifying the verb. For example, adverbs such as "likely", "certainly", "possibly" etc. may be used. An example of such an announcement is as follows: "Bob is unavailable to take your call. He is likely to be available after 2 pm." In other embodiments other grammatical constructions may be used.

In addition to the estimation of the user's proactive availability by calendar, as described immediately above, estimates can also be made by use of the user assertion and socially aware methods described above. The estimates made by these capabilities will be composed with the estimate made by the calendar capability by use of the confidence capability described above. In a typical situation, a user assertion will have a very high degree of confidence since it is derived from a considered judgement by the human user. However the confidence in the calendar function will be based on the confidence that has been derived from the analysis of the user's use of it. For example, if the user makes rare use of the calendar, and the confidence agent has found that the calendar is not a reliable source of information, then the calendar estimate may be of less value than that given by the general heuristics of the socially aware estimators.

The caller may use this information for their own purposes, either to send a direct message to the human user or as information that can be used for calling party features. For example, if the prospective availability is near enough in the future, a camp on (e.g. an automatic call-back) or call back feature can be initiated. Otherwise, the call could be sent to voice mail, abandoned or another recipient selected.

In some embodiments, an indication of the announcement may be conveyed to the user to inform the user of the call and to further inform the user that the caller was informed of an estimate of the user's proactive availability.

In some embodiments, the user may be given an option to turn the prospective availability service on or off. In other words, the user may indicate that he/she wishes the system 800 to determine prospective availability, or to handle any calls via a PBX system, including voicemail etc.

Those skilled in the art will appreciate that in some embodiments, the functionality of the tuple space 810, user interface agents 820, calendar agents 830, confidence agent 840, context agents 850, location agents 855 and the PAA 860 may be implemented using pre-programmed hardware or firmware elements (e.g., application specific integrated circuits (ASICs), electrically erasable programmable read-only memories (EEPROMs), etc.), or other related components. In other embodiments, the functionality of the tuple space 810, user interface agents 820, calendar agents 830, confidence agent 840, context agents 850, location agents 855 and the PAA 860 may be achieved using a computing apparatus that has access to a code memory (not shown) which stores computer-readable program code for operation of the computing apparatus. The computer-readable program code could be stored on a medium which is fixed, tangible and readable directly by these components, (e.g., removable diskette, CD-ROM, ROM, fixed disk, USB drive), or the computer-readable program code could be stored remotely but transmittable to these components via a modem or other interface device connected to a network (including, without limitation, the Internet) over a transmission medium. The transmission medium may be either a non-wireless medium (e.g., optical or analog communications lines) or a wireless medium (e.g., microwave, infrared, free-space optical or other transmission schemes) or a combination thereof.

Persons skilled in the art will appreciate that there are yet more alternative implementations and modifications possible for implementing the embodiments, and that the above implementations and examples are only illustrations of one or more embodiments. The scope, therefore, is only to be limited by the claims appended hereto.

What is claimed is:

1. A method of generating prospective availability data, the method comprising:
    receiving a request regarding an availability of a user for receiving a call;
    transmitting a message regarding the availability of the user as a response to the request;
    generating prospective availability data regarding the user using a processing server, including estimating the availability of the user for at least one future temporal block by applying availability rules to temporal block data for the user associated with said at least one future temporal block; and the message being generated in response to estimating that the user is available in said at least one future temporal block, wherein said estimating the availability of the user for said at least one future temporal block comprises querying at least one of a calendar of a user associated with said temporal block data and a calendar of at least one other user associated with said user to determine meetings in which said user may be involved and estimating confidence of said queried calendar by querying an estimator that monitors actual meeting information of the user associated with said queried calendar, comparing said actual meeting information with meeting information recorded in said queried calendar, and determining the proportion of accurately recorded meeting information with respect to a total amount of meeting information recorded, and giving preference to meetings associated with the queried calendar having the highest confidence when applying said availability rules.

2. The method of claim 1, wherein said applying said availability rules to said at least one future temporal block comprises applying said availability rules to a plurality of future temporal blocks.

3. The method of claim 2, wherein applying said availability rules to said plurality of future temporal blocks occurs in temporal order until at least one of said plurality of future temporal blocks is determined to be prospectively available.

4. The method of claim 1, wherein said estimating availability for said at least one future temporal block is further responsive to determining that current availability is not-available.

5. The method of claim 1, further comprising generating a prospective availability message in response to determining that said at least one future temporal block is prospectively available and transmitting said prospective availability message to indicate prospective availability as a response to said availability request.

6. The method of claim 5, further comprising generating a second prospective availability message for informing a user associated with said temporal block data of said transmitting said prospective availability message.

7. The method of claim 1, wherein said applying availability rules comprises determining a proactive availability and a reliability estimate of availability for said at feast one future temporal block.

8. The method of claim 7, further comprising generating a prospective availability message in response to determining that said at least one future temporal block is prospectively available and transmitting said prospective availability message to indicate prospective availability as a response to said availability request, said prospective availability message comprising said proactive estimate of availability and said reliability estimate.

9. The method of claim 1, wherein said availability rules comprise fuzzy indicators of degrees of availability, and said applying availability rules to said at least one future temporal block comprises pre-determined ones of said availability rules firing responses, and computing from said responses a crisp indicator of availability.

10. The method of claim 1, wherein said availability rules comprise at least one of a user indication rule, a location rule, a time rule, an activity rule and a call type rule.

11. The method of claim 1 wherein said querying at least one of a calendar of a user associated with said temporal block data and a calendar of at least one other user associated with said user comprises determining at least one of time period associated with each of said meetings, a location associated with each of said meetings, and co-present personnel associated with each of said meetings.

12. The method of claim 1, wherein said estimating availability for at least one future temporal block in an appointment schedule comprises transmitting an availability request and, in response, receiving an indication of availability.

13. The method of claim 1, wherein said availability comprises a confidence metric of availability determined by processing at least one estimate of availability for the at least one future temporal block.

* * * * *